United States Patent [19]

Murayama et al.

[11] Patent Number: 5,478,661
[45] Date of Patent: Dec. 26, 1995

[54] MAGNETIC RECORDING MEDIUM AND METHOD FOR ITS PRODUCTION

[75] Inventors: Akihiro Murayama; Masao Miyamura, both of Yokohama, Japan

[73] Assignee: AG Technology Co., Ltd., Yokohama, Japan

[21] Appl. No.: 40,200

[22] Filed: Apr. 1, 1993

[51] Int. Cl.$^6$ .................................................. G11B 5/66
[52] U.S. Cl. ............... 428/694 T; 428/702; 428/704; 428/900; 204/192.2
[58] Field of Search ................. 428/694 T, 900, 428/702, 704; 204/192.2

[56] References Cited

U.S. PATENT DOCUMENTS

| | | | |
|---|---|---|---|
| 4,511,635 | 4/1985 | Nagao et al. | 428/694 |
| 4,769,282 | 9/1988 | Tada et al. | 428/336 |
| 4,837,094 | 6/1989 | Kudo et al. | 428/694 |
| 5,062,938 | 11/1991 | Howard | 204/192.2 |
| 5,066,552 | 11/1991 | Howard et al. | 428/694 |

Primary Examiner—L. Kiliman
Attorney, Agent, or Firm—Oblon, Spivak, McClelland, Maier & Neustadt

[57] ABSTRACT

A magnetic recording medium having a magnetic thin film represented by the formula $Co_{100-a-b-x-y-z}Ni_aCr_bPt_xM_yO_z$ wherein a, b, x, y and z are atomic % satisfying $0 \leq a \leq 15$, $0 \leq b \leq 15$, $0 < x \leq 20$, $0 < y \leq 20$, $0 < z \leq 40$, $y+z \leq 40$, and $a+b+x+y+z \leq 60$, and M is at least one element selected from the group consisting of Si, B, Zr, Al, Y, P, Ti, Sn and In.

5 Claims, 9 Drawing Sheets

○ CoCrPt
● CoCrPtSiO

○ CoCrPt
● CoCrPtSiO

MAGNETIC RECORDING MEDIUM AND METHOD FOR ITS PRODUCTION

BACKGROUND OF THE INVENTION

1. Field of the Invention

The present invention relates to a magnetic recording medium and a method for producing it.

2. Discussion of Background

For hard magnetic disks used as high capacity recording media for computers, it has been desired to further increase the recording density in recent years. To accomplish the desired high recording density, it is usually very important to reduce media noises and to secure high coercivity of longitudinal magnetic thin films as recording media.

The reason why high coercivity is required, is that the length, a, of a magnetic transition region between magnetic domains constituting recording bits written by a magnetic head, depends on the in-plane coercivity $H_c$ of the magnetic film, as generally represented by $a= 2tM_r f(S^*)/H_c$, where t is the thickness of the magnetic film, $M_r$ is the remanence, and $f(S^*)$ indicates that a is a function of the coercive squareness $S^*$, whereby the larger the value of $S^*$ is, the smaller $f(S^*)$ becomes. From this formula, it is evident that the larger the values of $H_c$ and $S^*$ are, the smaller the value of a becomes, whereby high density recording can be accomplished. The reason why high density magnetic recording is made possible by reducing the value of a, is that in the reproduction of a recorded information, voltages created in the head by magnetic domains written in the magnetic film are differentiated and taken out as output signals, and accordingly, the smaller the value of a is, the more rapidly the magnetization will be inverted, i.e. the narrower the width in time of the output pulses as the differentiated waveforms becomes.

The coercivities of magnetic films of small-size magnetic disks which are presently commonly used, are at a level of from 900 to 1,500 Oe. Further, the value of $S^*$ is desired to be reasonably high, at least 0.7. Here, the reason for the presence of the upper limit for the coercivity is that there is a limit in the magnetic field to be formed by the writing head to be used.

Recently, however, it has been made possible to fly the head at a lower height, and accordingly, it has been made possible to apply a high magnetic field intensity to the magnetic thin film even with the head having the same magnetic field intensity. Further, by an improvement of the magnetic film material used for the head itself or by the precision processing of the coil portion due to the progress in fine processing, it has been made possible to further increase the magnetic field created by the head. Accordingly, by a combination of such a technology of the head and the low flying height of the head, it should be possible to prepare a magnetic recording medium with a higher recording density by increasing the coercivity while maintaining the coercive squareness of the magnetic thin film at a reasonably high level of at least 0.7.

The magnetic thin film materials presently commonly employed for in-plane magnetic recording media include a CoPt-based alloy such as CoNiPt, CoNiCrPt or CoCrPt and a CoCr-based alloy such as CoNiCr Or CoCrTa which is used in combination with a Cr underlayer. Their coercivities usually have an upper limit at a level of 1,800 Oe at a remanence of $3.0 \times 10^{-3}$ emu/cm² which is usually required for magnetic recording media for an inductive head. With CoPt-based magnetic thin films among them, it is known that a high coercivity can be accomplished by increasing the Pt concentration to a level of from 20 to 25 atomic %, as disclosed in e.g. IEEE Trans. Magn. MAG-19 (1983) 1514, J. Appl. Phys. 54 (1983) 7089, or IEEE Trans. Magn. MAG-19 (1983) 1638. However, such a method is not practically useful, since it involves a substantial increase of costs. Further, incorporation of such a large amount of Pt element tends to lead to a substantial decrease in the remanence, such being undesirable from the viewpoint of signal to noise ratio at the reproduction process.

Accordingly, for a practical industrial application, the high coercivity must be accomplished with a low Pt concentration at a level of about 10 atomic % which is feasible from the viewpoint of costs. As such an attempt, it has been reported that a high coercivity at a level of at least 2,000 Oe has been accomplished by forming a CoCrPtB film (Pt: 6.5 atomic %) having B incorporated, on a Cr underlayer (14th Meeting of Japan Applied Magnetic Association, 8 pB-18 (1990)). However, the production process requires a substrate temperature as high as 280° C. and a substrate bias of −300 V and thus has substantial yield problems yet to be solved for mass production. Further, Japanese Unexamined Patent Publication No. 84723/1991 discloses that a magnetic film having a high coercivity at a level of at least 2,000 Oe was prepared by incorporating an element such as P, Si, Ge, B, Ga, Al, In, Sn or Sb to CoPt and sputtering the material in an Ar gas containing oxygen. However, the magnetic film prepared in such a manner has a serious practical problem such that both the squareness and the coercive squareness are less than 0.7, and it can not be regarded as suitable as a high density recording medium.

Further, in designing a practical hard magnetic drive, an optimum value exists for the coercivity for the read and write characteristics, particularly for the overwrite characteristics, by the combination with a head, and it is necessary to adjust the coercivity of the magnetic film. Accordingly, the coercivity must be adjusted to a high level and must be easily adjusted for mass production without substantially changing other magnetic properties.

Further, to accomplish high density magnetic recording, it is very important for a magnetic recording medium that the noise attributable to the medium during the reproduction of a recorded information is low. The media noise of thin film media are usually dominantly caused by the irregularities in the domain structure of the magnetic transition boundary regions i.e. by the formation of so-called zigzag domains, which is largely influenced by the crystal grain structure of the magnetic thin film (J. Appl. Phys., 63, 3248 (1988)).

Accordingly, to reduce the media noise, it is necessary to study the alloy composition of the magnetic film and to control the sputtering process to modify and control the crystal grain structure of the magnetic thin film. It is known that the media noise can be reduced by using a NiP sputtering underlayer for a magnetic film of CoPt-based alloy (U.S. Pat. No. 4,786,564). In this proposal, the crystal grain structure of the NiP underlayer is effectively used to control the crystal grain structure of the magnetic film.

However, as a result of a study by the present inventors, it has been found that to reduce the noise to a level required for future high density magnetic recording, this method alone is inadequate, and it is necessary to further reduce the media noise by improving the magnetic film material and utilizing the synergistic effect of the underlayer and the magnetic film material. Thus, if the above-mentioned improvements for the high coercivity and reduction of the media noise can be accomplished with a CoPt-based magnetic film using a NiP sputtering film as the underlayer, it will be possible to accomplish magnetic recording at a higher density.

SUMMARY OF THE INVENTION

It is an object of the present invention to solve the above-mentioned problems and to provide a new a magnetic film having a reasonably high coercive squareness of at least 0.7 and a coercivity of at least 2,000 Oe at a remanence of $3.0 \times 10^{-3}$ emu/cm$^2$ and provided with low media noise characteristics, and a magnetic recording medium employing such a magnetic film.

The present invention has been made to solve the above problems and provides a magnetic recording medium having a magnetic thin film represented by the formula $Co_{100-a-b-x-y-z}Ni_aCr_bPt_xM_yO_z$ wherein a, b, x, y and z are atomic % satisfying $0 \leq a \leq 15$, $0 \leq b \leq 15$, $0 < x \leq 20$, $0 < y \leq 20$, $0 < z \leq 40$, $y+z \leq 40$, and $a+b+x+y+z \leq 60$, and M is at least one element selected from the group consisting of Si, B, Zr, Al, Y, P, Ti, Sn and In.

Further, the present invention provides a method for producing a magnetic recording medium having a magnetic thin film represented by the formula $Co_{10-a-b-x-y-z}Ni_a Cr_bPt_xM_yO_z$ wherein a, b, x, y and z are atomic % satisfying $0 \leq a \leq 15$, $0 \leq b \leq 15$, $0 < x \leq 20$, $0 < y \leq 20$, $0 < z \leq 40$, $y+z \leq 40$, and $a+b+x+y+z \leq 60$, and M is at least one element selected from the group consisting of Si, B, Zr, Al, Y, P, Ti, Sn and in, which comprises forming the magnetic thin film by a sputtering method using a target having an oxide ($MO_d$ wherein $0 < d \leq 5$) of at least one element (M) selected from the group consisting of Si, B, Zr, Al, Y, P, Ti, Sn incorporated into a base material of a CoNiPt alloy, a CoCrPt alloy or a CoNiCrPt alloy.

Here, at least one of Ni and Cr may be contained in the magnetic thin film in the present invention. Therefore, a and b are not simultaneously 0. Further, the above magnetic thin film may contain nitrogen.

DETAILED DESCRIPTION OF THE PREFERRED EMBODIMENTS

As mentioned above, future high density magnetic recording media are desired to have a coercive squareness of at least 0.7 and an in-plane coercivity of at least 2,000 Oe. In the present invention, to accomplish this object, a magnetic film is formed by a sputtering method using a target having an oxide of at least one element selected from the group consisting of Si, B, Zr, Al, Y, P, Ti, Sn incorporated into a base material of a CoNiCrPt alloy. As such a target, a hot press target obtained by mixing and sintering powders of a magnetic alloy and an oxide, or a composite target having oxide chips uniformly placed on a magnetic alloy target, may be employed. Otherwise, a dual-target sputtering so-called co-sputtering may be employed in which targets of a magnetic alloy and an oxide are separately sputtered, and a substrate is rotated at a high speed in front of the two targets, or incident sputter particles are led onto the same substrate to let a film grow.

As mentioned above, with a CoPt-based magnetic film such as CoNiPt, CoNiCrPt or CoCrPt, it is possible to obtain a coercivity of from 1,200 to 1,500 Oe at a Pt concentration of about 10 atomic %. The present inventors have found it possible to remarkably increase the in-plane coercivity of the magnetic film to a level of at least 2,000 Oe by incorporating an oxide of at least one element selected from the group consisting of Si, B, Zr, Al, Y, P, Ti, Sn into the target alloy at the time of forming such a CoPt-based magnetic film. Further, it has been found that the magnetic thin film thus prepared has a reasonably high coercive squareness of at least 0.7 and is provided with magnetic characteristics adequate for a high density magnetic recording medium without no substantial decrease in the squareness or the remanence.

Here, if the proportion of the oxide incorporated, exceeds 20 atomic %, the remanence starts to decrease, and especially when the oxide concentration exceeds 40 atomic %, the remanence decreases substantially, and the medium will be no longer suitable as a high density magnetic recording medium. The oxide concentration is preferably at most 20 atomic % especially for an inductive head, such as a thin film head or a MIG head which is presently widely used.

From the analysis of the prepared magnetic films by infrared absorption spectroscopy, it has been found that the films contain the same MO form oxides as in the targets. This indicates that the oxides contained in the targets are not substantially decomposed even in the sputtering process. Further, when a non-oxide element constituting the oxide is incorporated alone, the coercivity increases in some cases, but such an increase is at a level of 200 Oe at best. It has been found that the substantial increase in the coercivity at a level of at least 500 Oe is the effect attributable to the additive in the form of an oxide. On the other hand, if reactive sputtering is conducted by introducing an oxygen gas at the time of sputtering a CoPt-based alloy film, the magnetic alloy tends to be oxidized, and there will be substantial decreases in the coercivity, the saturated magnetization, the remanence, the squareness and the coercive squareness. Thus, such a method is practically useless.

In the present invention, the oxide having preliminarily incorporated in the target will not be decomposed during sputtering process. Accordingly, it is possible to form a magnetic film having a high coercivity without bringing about oxidation of the magnetic alloy. Japanese Unexamined Patent Publication No. 84723/1991 discloses that a magnetic film having a high coercivity of at least 2,000 Oe was prepared by incorporating an element such as P, Si, Ge, B, Ga, Al, In, Sn and Sb to CoPt and conducting the sputtering in an Ar gas containing oxygen. However, the magnetic film thus prepared has a serious practical problem with the squareness and the coercive squareness being as low as less than 0.7, and such a magnetic film is hardly useful as a high density recording medium. Such a difference in the magnetic properties is believed to be attributable to the manner of film formation wherein the reactive sputtering is conducted by using oxygen resulting in a partial oxidization of Co, and the resulting film material is believed to be essentially different from the magnetic film proposed by the present invention.

As mentioned above, the low media noise is also an important property for a magnetic recording medium in addition to the high coercivity. The present inventors have found that this $Co_{100-a-b-x-y-z}Ni_aCr_bPt_xM_yO_z$ magnetic film has the media noise remarkably reduced as compared with a CoNiCrPt alloy magnetic film containing no oxide. Here, there is no deterioration in the magnetic properties such as the coercivity and the squareness. As a result, the bit shift which directly represents the magnetic recording density, is improved by the incorporation of the oxide. Further, it has been found that the effect for reducing the noise is more remarkable when a NiP sputtering underlayer is used. Thus, the $Co_{100-a-b-x-y-z}Ni_aCr_bPt_xM_yO_z$ magnetic film prepared by a target having an oxide incorporated has been found to be suitable as a future high density magnetic recording medium. By the above-mentioned method of the present invention, it has been made possible to realize a high coercivity of at least 2,000 Oe at a remanence of $3.0 \times 10^{-3}$ emu/cm$^2$ and a remarkably low media noise property while maintaining a reasonably high coercive squareness of at least 0.7, which is considered to be necessary for a high recording density, even when the proportion of Pt in a CoPt-based alloy magnetic film is at a level of 10 atomic %, so that the cost is sufficiently low.

Now, the present invention will be described in further detail with reference to Examples. However, it should be understood that the present invention is by no means restricted by such specific Examples.

EXAMPLE 1

A magnetic recording medium having NiP/CoNiPtSiO/carbon films sequentially laminated on an aluminum disk substrate having a NiP plating layer formed on the surface in a thickness of 15 μm, followed by texturing treatment, was formed by sputtering. For the formation or the magnetic film, a composite target having chips of SiO$_2$ as an oxide (hereinafter referred to as SiO$_2$ chips) uniformly placed on a $Co_{81}Ni_7Pt_{12}$ alloy target, was used. The thickness of the NiP (15 wt % P) underlayer film was 420 Å, and the thickness of the magnetic film was 500 Å. The sputtering pressure was 20 mTorr and an Ar gas containing 0.1 vol % of nitrogen gas was used. During the sputtering, no intentional heating of the substrate or no application of a bias voltage to the substrate was conducted during sputtering.

Figure 1:
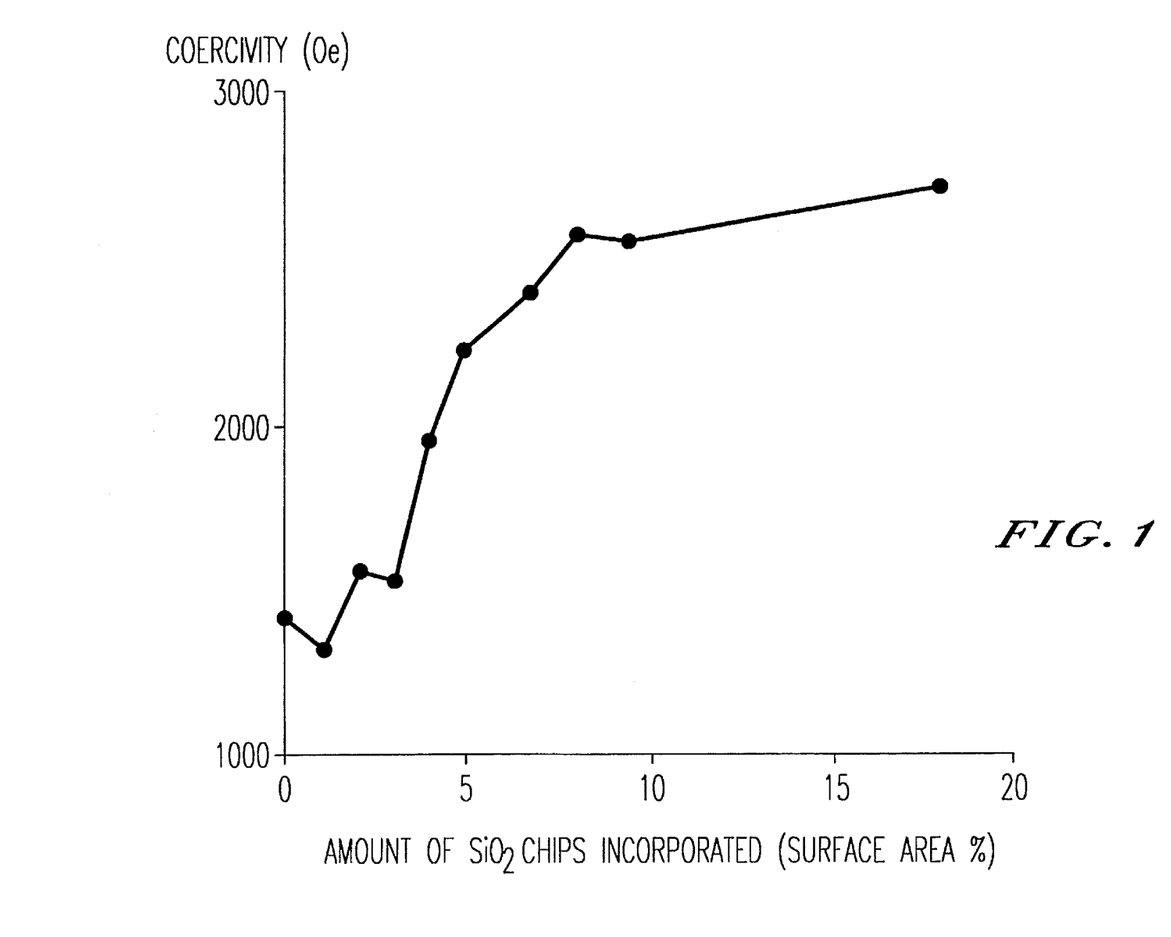
FIG. 1 is a graph showing the change, against the amount SiO$_2$ incorporated, in the coercivity of a magnetic film formed by sputtering by means of a composite target having SiO$_2$ chips placed on a Co$_{81}$Ni$_7$Pt$_{12}$ alloy target.

FIG. 1 shows the values of the in-plane coercivity obtained when the surface area ratio to the target of the SiO$_2$ chips placed on the target was varied from 0 to 17 surface area %. While the coercivity was 1,400 Oe when no SiO$_2$ was incorporated, the coercivity rapidly increased as SiO$_2$ was incorporated, and a coercivity of at least 2,500 Oe was obtained when SiO$_2$ was incorporated 9.5%. Here, the composition of the actually sputtered film was analyzed by an Auger electron spectroscopy, whereby, for example, when SiO$_2$ was incorporated to the target at a surface ratio of 9.5%, SiO$_2$ in the formed film was 7.9 atomic %.

Figure 2:
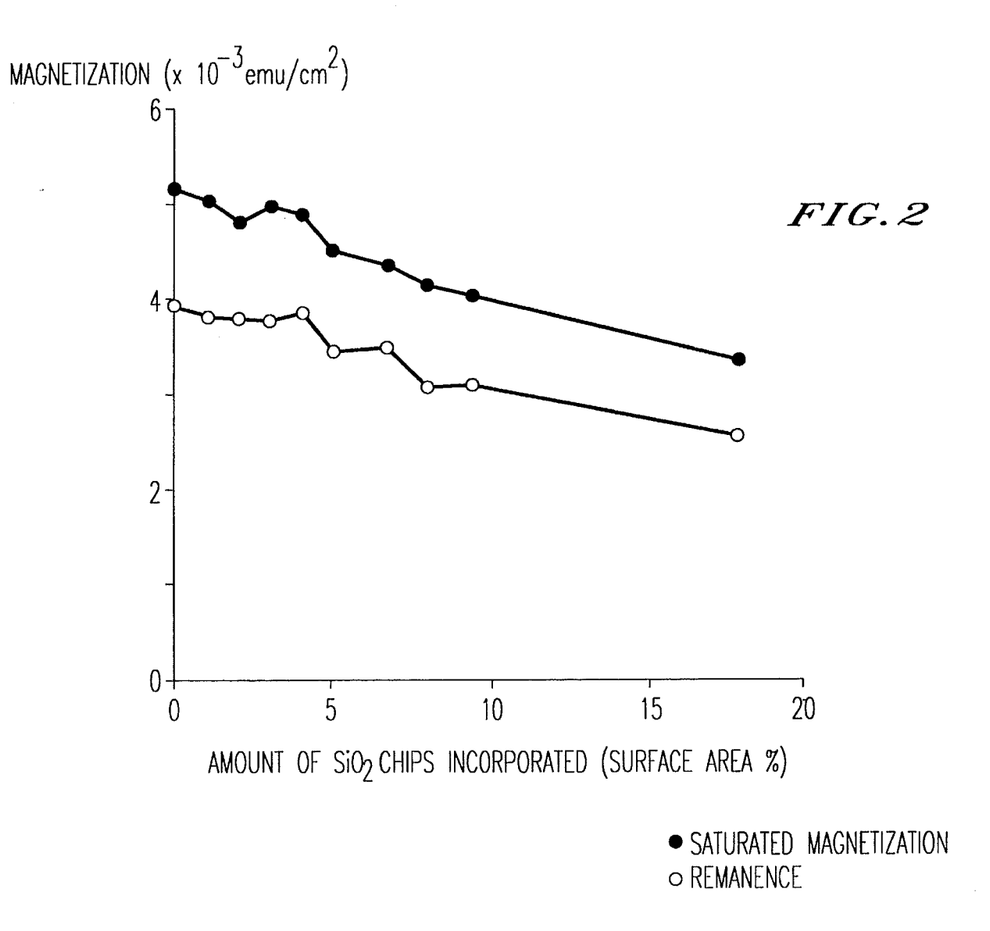
FIG. 2 is a graph showing the changes in the saturated magnetization and the remanence of a CoNiPtSiO magnetic film against the amount of SiO$_2$ incorporated.

FIG. 2 shows the values of the saturated magnetization and the remanence per unit area. Both values decrease with an increase of SiO$_2$, but, for example, even if SiO$_2$ is incorporated in a surface area ratio of 9.5%, the decreases are as small as about 20%, whereby the decrease in the read-out amplitude can be adjusted by increasing the thickness of the magnetic film and thereafter creates no practical problem.

Figure 3:
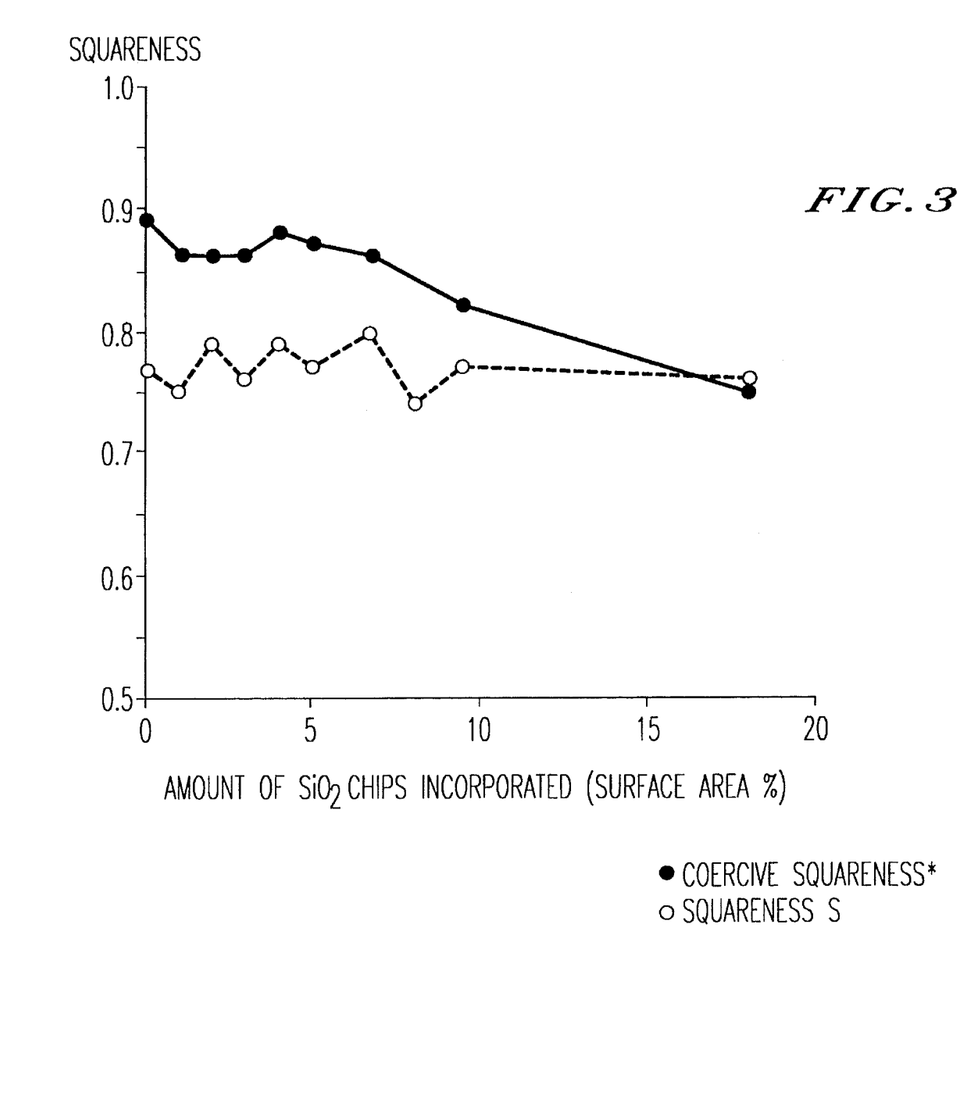
FIG. 3 is a graph showing the changes in the squareness S (remanence/saturated magnetization) and the coercive squareness S* of a CoNiPtSiO magnetic film against the amount of SiO$_2$ incorporated.

Further, FIG. 3 shows the changes in the squareness S and the coercive squareness S* in such a case. No substantial change is observed in both by the incorporation of SiO$_2$. S=0.77 and S*=0.87 when 5% of SiO$_2$ was incorporated, and S=0.77 and S*=0.82 even when 9.5% of SiO$_2$ was incorporated. Thus, practically adequate values were obtained for both of them.

Here, the effect of incorporating SiO$_2$ to a CoNiPt alloy magnetic film is not limited to the above composition.

For example, when SiO$_2$ was likewise incorporated to a $Co_{79}Ni_6Pt_{15}$ alloy target, the coercivity increased with an increase of SiO$_2$, and a maximum coercivity of 3,100 Oe was obtained when 9.5% of SiO$_2$ was incorporated, while the coercivity was 1,700 Oe when no SiO$_2$ was incorporated.

EXAMPLE 2

In the same manner as in Example 1, a magnetic recording medium having NiP/CoNiPtSiO/carbon films sequentially laminated on the aluminum disk substrate, was formed by sputtering. For the formation of the magnetic film, a composite target having 5 surface area % of SiO$_2$ chips placed on a $Co_{81}Ni_7Pt_{12}$ alloy target, was used. The thickness of the NiP underlayer film was 420 Å, and the thickness of the magnetic film was 500 Å. The coercivity of the magnetic film was adjusted depending upon the writing ability of the head (the head properties) by changing the amount of the nitrogen gas in the Ar gas during the sputtering. Table 1 shows the electro-magnetic properties of the CoNiPtSiO magnetic films thus formed and the CoNiPt film prepared without placing SiO$_2$ chips, as a Comparative Example.

TABLE 1

| | Sample No. | Amount of SiO$_2$ incorporated (%) | Coercivity (Oe) | Amplitude (mV) | Resolution (%) | Overwrite (dB) | S/N ratio (dB) | Bit shift (nsec) |
|---|---|---|---|---|---|---|---|---|
| Example of the present invention | A | 5 | 1611 | 0.39 | 84.6 | 35.3 | 32.7 | 8.76 |
| | B | 5 | 1303 | 0.37 | 78.0 | 36.9 | 32.8 | 9.34 |
| Comparative Example | C | 0 | 1343 | 0.42 | 79.8 | 37.1 | 27.9 | 11.56 |

For the measurements, writing and reading were conducted by a thin film head with a flying height of 0.1 μm. The writing current was 27 mA. The frequency of the writing signal was 5 MHz, and a frequency of 1.88 MHz was used for the overwrite measurement.

The results of the measurements show that by the incorporation of SiO$_2$ as an oxide, the S/N value which represents signal amplitude to media noise ratio, was substantially improved from about 28 dB to 33 dB without deterioration of the amplitude, the resolution showing the ratio of the amplitude at a writing frequency of 2.5 MHz to the amplitude at 5 MHz by percentage and representing the high frequency characteristic of the medium, and the overwrite value representing the rewriting ability of the medium. Consequently, the bit shift value representing a capability of high recording density was improved by at least 2 nsec from 11.56 nsec.

Further, with the same amount of SiO$_2$ incorporated, sample A having a higher coercivity than B shows a low bit shift value excellent in the high density recording property as compared with sample B. This indicates that a magnetic film having a low media noise and a high coercivity is more suitable as a high density magnetic recording medium.

EXAMPLE 3

A magnetic recording medium having NiP/CoCrPtSiO/carbon films sequentially laminated on the same aluminum substrate as used in Example 1, was formed by sputtering. The thickness of the NiP underlayer film was 420 Å. For the formation of the magnetic film, a composite target having 5 surface area % of SiO$_2$ chips placed on a Co$_{76}$Cr$_{12}$Pt$_{12}$ alloy target and an Ar gas containing 0.1% of a nitrogen gas, were used. The pressure was 20 mTorr. Further, during the sputtering, no intentional heating of the substrate or no application of a bias voltage to the substrate was conducted.

Figure 4:
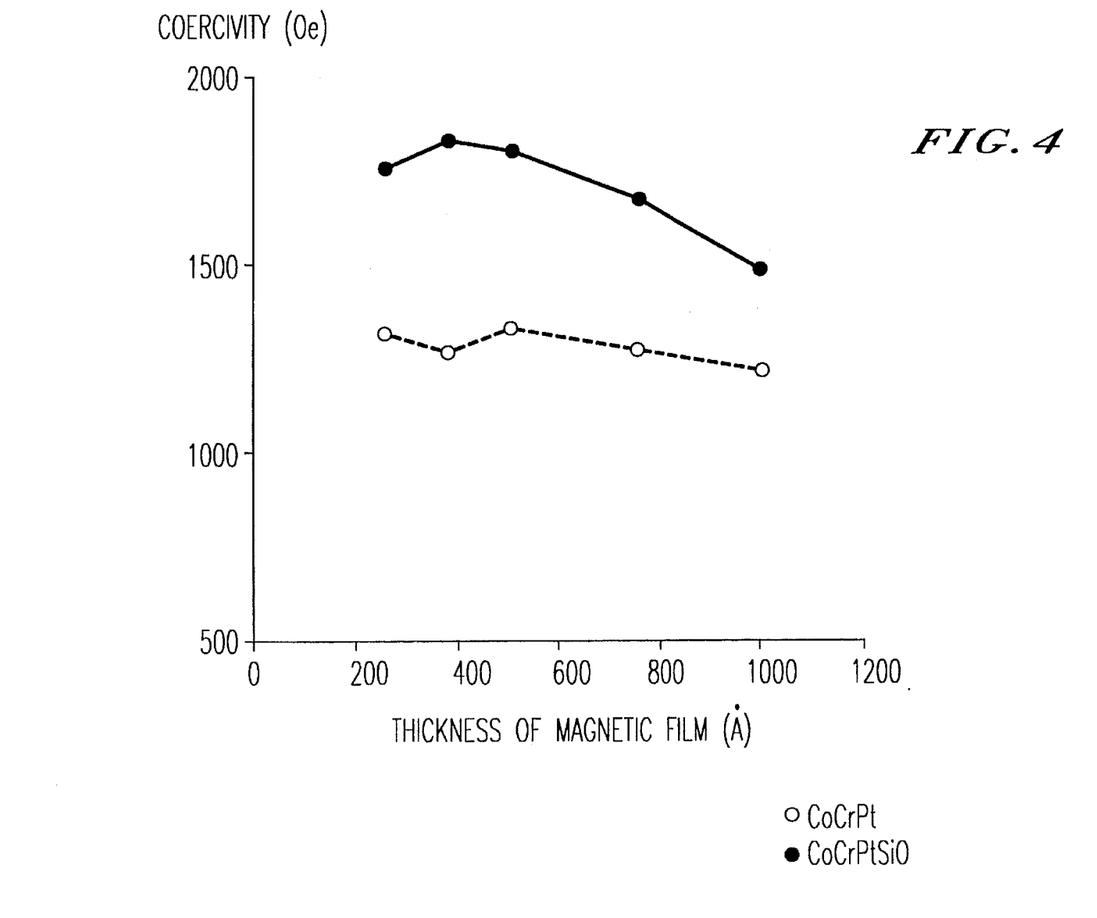
FIG. 4 is a graph showing the changes, against the magnetic film thickness, in the coercivities of a Co$_{76}$Cr$_{12}$Pt$_{12}$ magnetic film and a magnetic film formed by sputtering by means of a composite target having SiO$_2$ chips placed on a Co$_{76}$Cr$_{12}$Pt$_{12}$ alloy target in a surface area ratio of 5%.

FIG. 4 shows the values of the in-plane coercivity obtained when the magnetic film thickness was varied from 250 Å to 1,000 Å by changing the sputtering time, as compared with the coercivity when no SiO$_2$ was incorporated. It is shown that the coercivity increased by the incorporation of SiO$_2$. For example, while coercivity was at a level of 1,270 Oe when no SiO$_2$ was incorporated in a film thickness of 400 Å, an increase of the coercivity by at least 500 Oe to a level of 1,820 Oe was observed by the incorporation of SiO$_2$. Here, the composition of the actually sputtered film was analyzed by an Auger electron spectroscopy, whereby, for example, when the film thickness was 400 Å, the concentration of SiO$_2$ was found to be 3.8 atomic %. Further, the maximum value of the coercivity by the incorporation of SiO$_2$ was at a level of 1,800 Oe under the sputtering conditions as shown above. However, when the pressure was changed to 30 mTorr, a maximum value of 2,200 Oe was obtained.

Figure 5A:
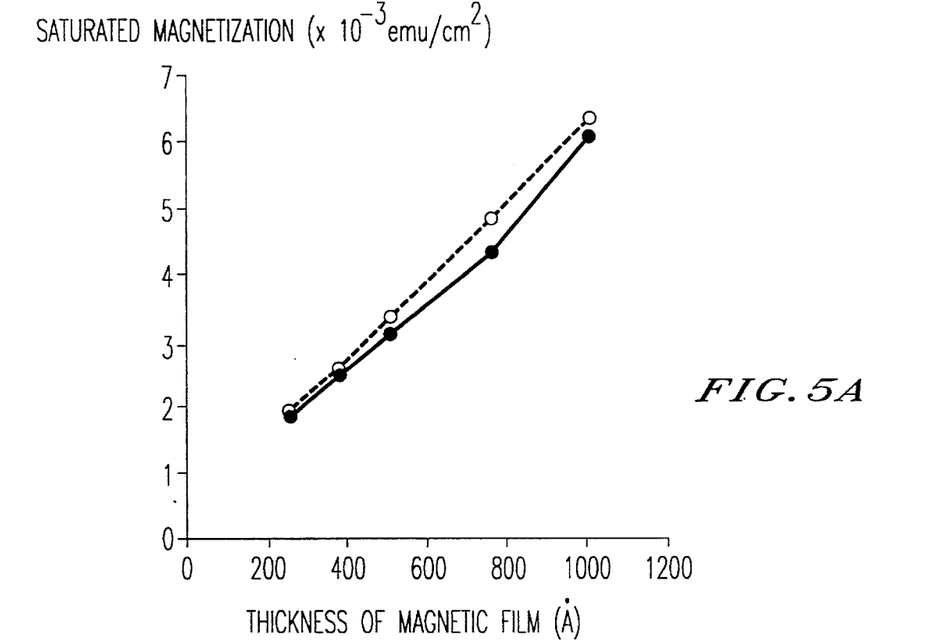
FIG. 5(a) is a graph showing the change in the saturated magnetization of a CoCrPtSiO magnetic film against the thickness of the magnetic film.
Figure 5B:
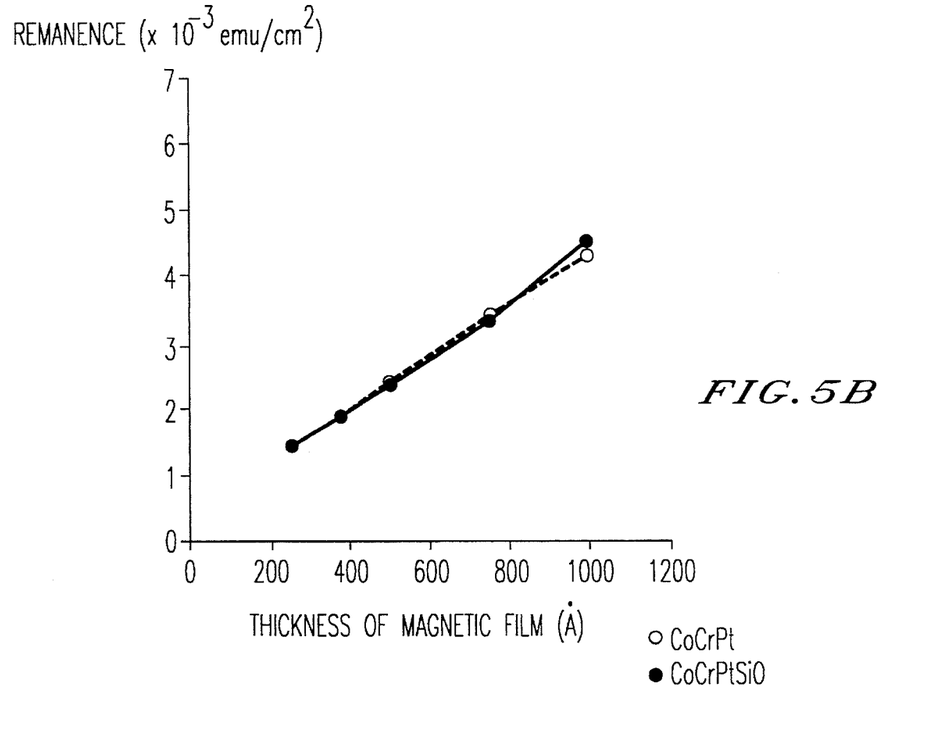
FIG. 5(b) is a graph showing the change in the remanence of a CoCrPtSiO magnetic film against the thickness of the magnetic film.

FIG. 5(a) shows the values of the saturated magnetization in this case, and FIG. 5(b) shows the values of the remanence. While the saturation magnetization decreased by the incorporation of SiO$_2$, the remanence remained to be substantially at the same level. This is the effect attributable to the improvement of the squareness S as described hereinafter and is a merit obtained by the incorporation of SiO$_2$.

Figure 6A:
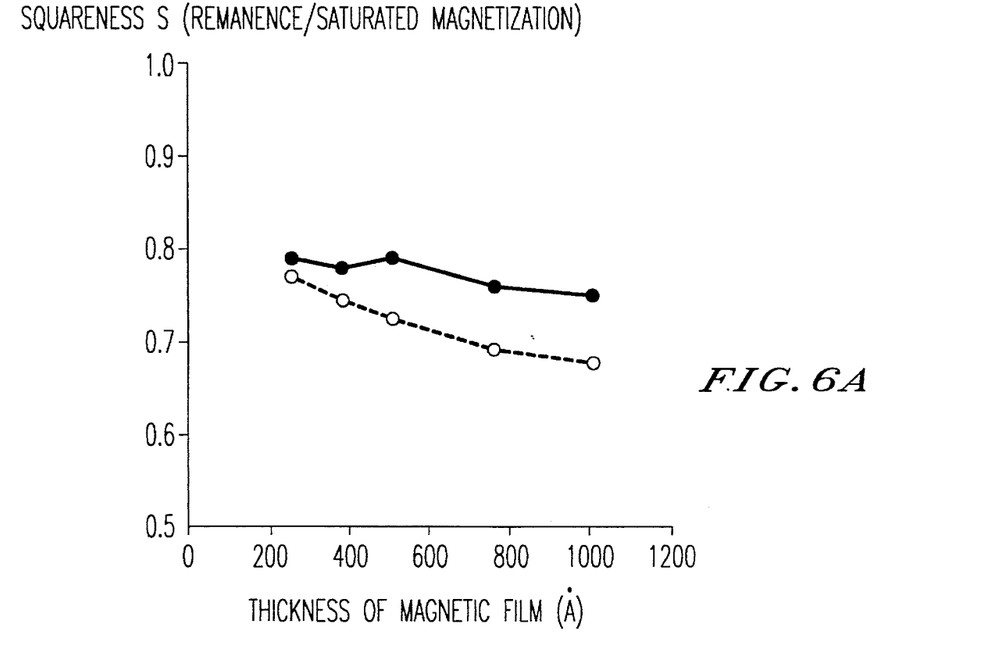
FIG. 6(a) is a graph showing the change in the squareness S of a CoCrPtSiO magnetic film against the thickness of the magnetic film.
Figure 6B:
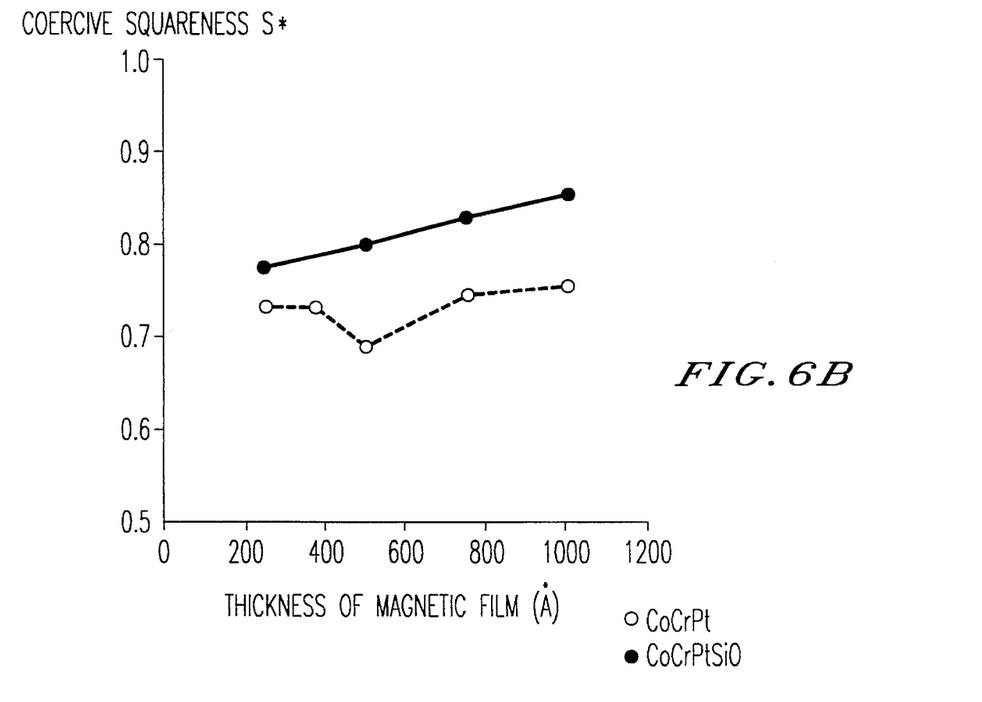
FIG. 6(b) is a graph showing the change in the coercive squareness S* of a CoCrPtSiO magnetic film against the thickness of the magnetic film.

FIG. 6(a) shows the change in the squareness S in this case, and FIG. 6(b) shows the change in the coercive squareness S*. When no SiO$_2$ was incorporated, S and S* deteriorated to a level of less than 0.7, which is problematic from the viewpoint of the electro-magnetic properties. By the incorporation of SiO$_2$, a substantial improvement at a level of from 0.05 to 0.10 was observed, and adequate values were obtained.

Here, the effect of incorporating SiO$_2$ to a CoCrPt alloy magnetic film is not limited to the above composition. For example, when SiO$_2$ was likewise incorporated to a Co$_{75}$Cr$_{10}$Pt$_{15}$ alloy target, the coercivity increased by the incorporation of SiO$_2$, and in a magnetic film thickness of 400 Å, a coercivity of 2,030 Oe was obtained when 5 surface area % of SiO$_2$ was incorporated, while the coercivity was 1,550 Oe when no SiO$_2$ was incorporated.

EXAMPLE 4

A magnetic recording medium having NiP/CoCrPtSiO/carbon films sequentially laminated on the same aluminum disk substrate as used in Example 3, was formed by sputtering. For the formation of the magnetic film, a composite target having 5 surface area % or 9.5 surface area % of SiO$_2$ chips placed on a Co$_{76}$Cr$_{12}$Pt$_{12}$ alloy target, was used. The thickness of the NiP underlayer film was 420 Å, and the thickness of the magnetic film was 500 Å. The coercivity of the magnetic film was adjusted by changing the amount of the nitrogen gas in the Ar gas during the sputtering.

In Table 2, the electro-magnetic properties of the CoCrPt-SiO magnetic films prepared and a CoCrPt film for comparison, are shown.

TABLE 2

| Sample No. | Amount of SiO$_2$ incorporated (%) | Coercivity (Oe) | Amplitude (mV) | Resolution (%) | Overwrite (dB) | S/N ratio (dB) | Bit shift (nsec) |
|---|---|---|---|---|---|---|---|
| Example of the present invention A | 5 | 1507 | 0.28 | 79.2 | 38.1 | 35.8 | 9.70 |
| B | 9.5 | 1703 | 0.29 | 83.1 | 36.2 | 37.0 | 9.30 |
| Comparative Example C | 0 | 1338 | 0.29 | 76.4 | 38.8 | 34.9 | 10.30 |

For the measurements, writing and reading were conducted by a thin film head with a flying height of 0.1 μm. The writing current was 27 mA. The frequency of the writing signal was 5 MHz, and 1.88 MHz was employed for the overwrite measurement.

The results of the measurements show that the S/N value representing signal amplitude to media noise ratio was improved from about 35 dB with an increase in the amount of SiO$_2$ incorporated, and a value of 37 dB was obtained when 9.5% of SiO$_2$ was incorporated. Further, reflecting the improvements in the high coercivity and the coercive squareness by the incorporation of SiO$_2$, a remarkable improvement in the pulse resolution was observed, and the bit shift value was improved by 1 nsec along with the above-mentioned improvement in the low media noise property. Further, the overwrite value usually decreases as the coercivity increases, but in this Example, the degree of such a decrease was very small. This represents the effect attributable to the above-mentioned improvement in the coercive squareness.

EXAMPLE 5

A magnetic recording medium having NiP/CoNiPtMO/ carbon films sequentially laminated on the same aluminum substrate as used in Example 1, was formed by sputtering. Here, M is Si, Ti, Al, Zr or Y. For the formation of the magnetic film, a composite target having from 1 to 5 surface area % of chips of an oxide (SiO$_2$, TiO$_2$, Al$_2$O$_3$, ZrO$_2$ or Y$_2$O$_3$) placed on a Co$_{81}$Ni$_7$Pt$_{12}$ alloy target, was used. The thickness of the NiP underlayer film was 420 Å, and the thickness of the magnetic film was 500 Å. The sputtering pressure was 20 mTorr and an Ar gas containing 0.1 vol % of nitrogen gas was used. During the sputtering, no intentional heating of the substrate or no application of a bias voltage to the substrate was conducted.

Figure 7:
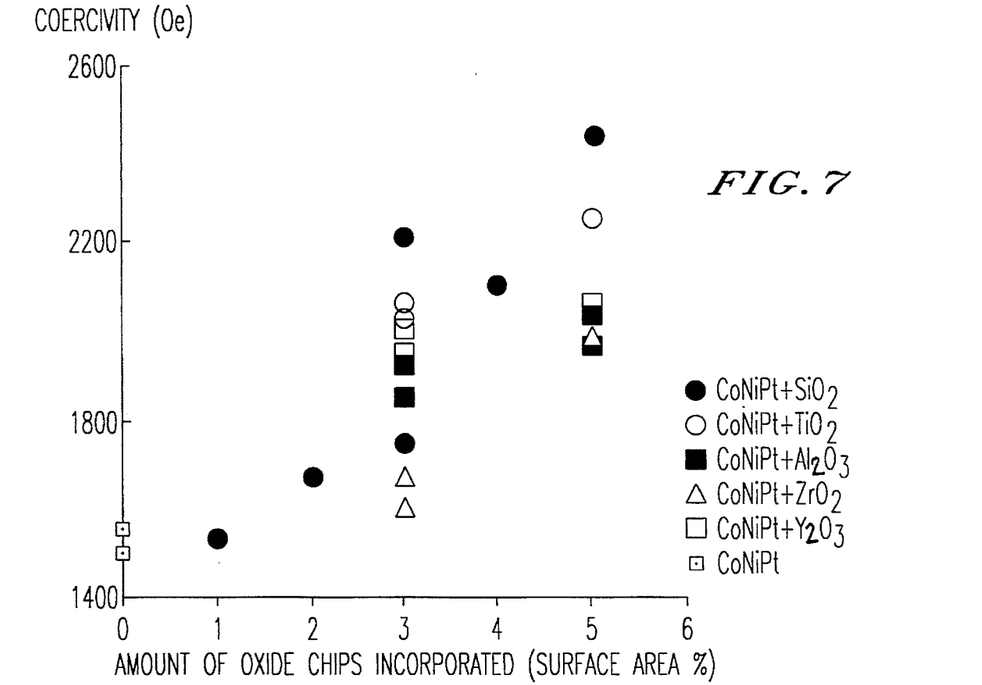
FIG. 7 is a graph showing the changes, against the oxide concentration, in the coercivities of magnetic films obtained by sputtering by means of composite targets having various oxide chips placed on Co$_{81}$Ni$_7$Pt$_{12}$ alloy targets.

FIG. 7 shows the obtained in-plane coercivities plotted against the chip surface area ratio.

In each case where an oxide is incorporated, the coercivity increases with an increase in the chip surface area ratio, as compared with a case where no oxide is incorporated. For example, at 5 surface area %, a coercive force of 2,400 Oe was obtained by the incorporation of SiO$_2$, and even in the case of Al$_2$O$_3$ where the increase of the coercivity is smallest, a coercivity of at least 1,900 Oe was obtained, while the coercivity is at a level of 1,500 Oe when no oxide was incorporated. In each case, no substantial decrease was observed in the saturated magnetization, the remanence, the squareness S or the coercive squareness S*, and there was no practical problem. Here, the oxide concentration in the actually sputtered film was analyzed by an Auger electron spectroscopy, whereby the proportion was at a level of from 3.5 to 4 atomic %, when 5 surface area % of the oxide was incorporated.

EXAMPLE 6

A magnetic recording medium having NiP/CoNiCrPtSiO/ carbon films sequentially laminated on the same aluminum substrate as used in Example 1, was formed by sputtering. The thickness of the NiP underlayer film was 420 Å. For the formation of the magnetic film, a composite target having 5 or 9.5 surface area % of Cr and from 0 to 9.5 surface area % of SiO$_2$ chips placed on a Co$_{81}$Ni$_7$Pt$_{12}$ alloy target and an Ar gas containing 0.1 vol % of nitrogen gas were used. The pressure was 20 mTorr. No intentional heating of the substrate or no application of a bias voltage to the substrate was conducted during the sputtering. The thickness of the magnetic film was adjusted by changing the sputtering time so that the saturated magnetization would be 5×10$^{-3}$ emu/cm$^2$ when no SiO$_2$ was incorporated, at each amount of Cr incorporated. With respect to the incorporation of SiO$_2$, the film thickness was made constant.

Figure 8:
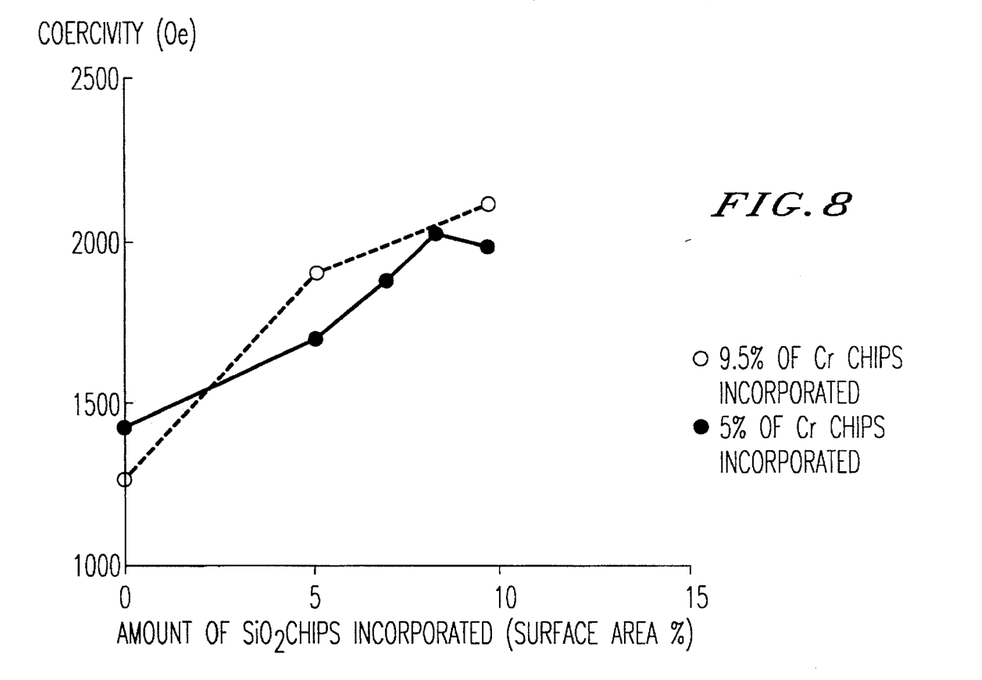
FIG. 8 is a graph showing the changes, against the SiO$_2$ concentration, in the coercivities of magnetic films obtained by sputtering by means of composite targets having Cr chips and SiO$_2$ chips placed, respectively, on Co$_{81}$Ni$_7$Pt$_{12}$ alloy targets.

FIG. 8 shows the effect of the incorporation of SiO$_2$ to the coercivity at each concentration of Cr incorporated. In each concentration of Cr incorporated, the coercivity increased as compared with the case where no SiO$_2$ was incorporated. For example, when Cr was 5 area %, the coercivity was at a level of 1,420 Oe when no SiO$_2$ was incorporated. Whereas, when 5 area % of SiO$_2$ was incorporated, the coercivity was 1,690 Oe, and when 9.5 area % of SiO$_2$ was incorporated, the coercivity was 1,980 Oe. Thus, in each case, an increase in the coercivity was observed. Further, at 9.5 area % of Cr, the coercivity was at a level of 1,270 Oe when no SiO$_2$ was incorporated. Whereas, by the incorporation of 9.5 area % of SiO$_2$, a substantial increase in the coercivity at a level of 2,100 Oe was observed. Here, the concentrations in the actually sputtered films were analyzed by an Auger electron spectroscopy, whereby the Cr proportion was 5 atomic % when 5 area % was incorporated, and it was 10 atomic % when 9.5 area % was incorporated. For example, the composition of the magnetic thin film when 5 area % of Cr and 9.5 area % of SiO$_2$ were incorporated, was determined to be Co$_{75}$Ni$_5$Cr$_5$Pt$_{10}$ (SiO2)5.

Figure 9A:
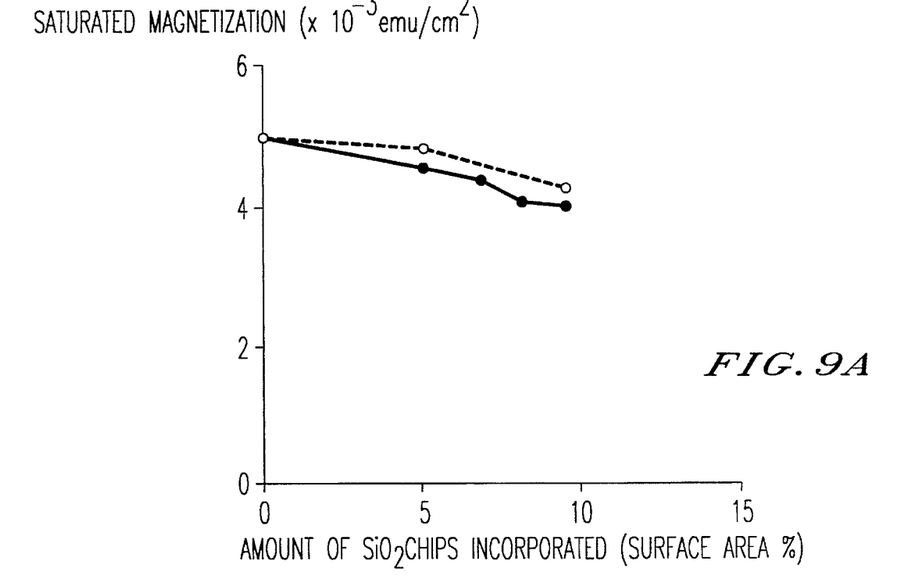
FIG. 9(a) is a graph showing the change in the saturated magnetization of a CoNiCrPtSiO magnetic film against the amount of SiO$_2$ incorporated.
Figure 9B:
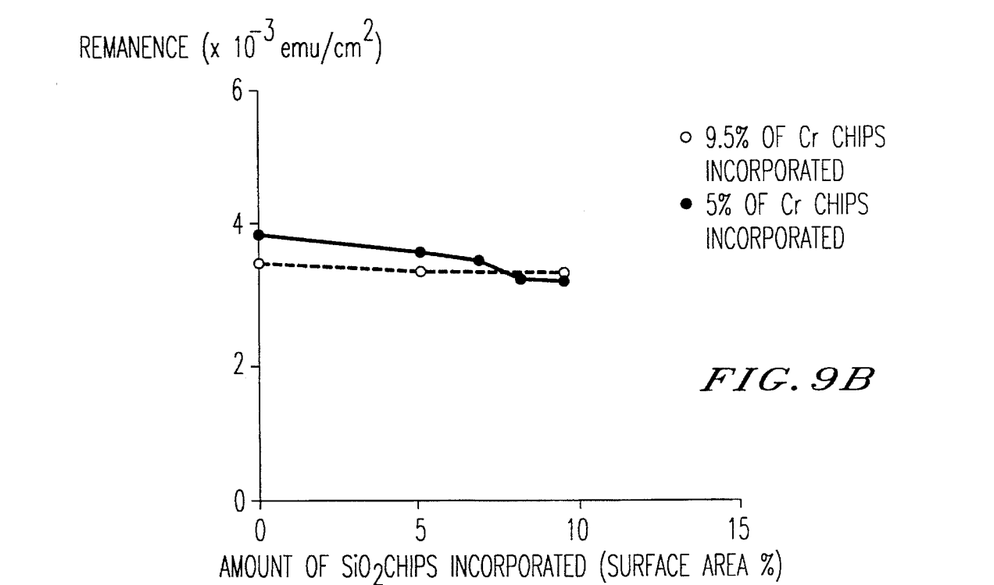
FIG. 9(b) is a graph showing the change in the remanence of a CoNiCrPtSiO magnetic film against the amount of SiO$_2$ incorporated.

FIG. 9(a) shows the values of the saturated magnetization of the above magnetic films, and FIG. 9(b) shows the values of the remanence. The saturated magnetization and the remanence decrease as SiO$_2$ is incorporated, but such a decrease is at a level which creates no practical problem.

Figure 10A:
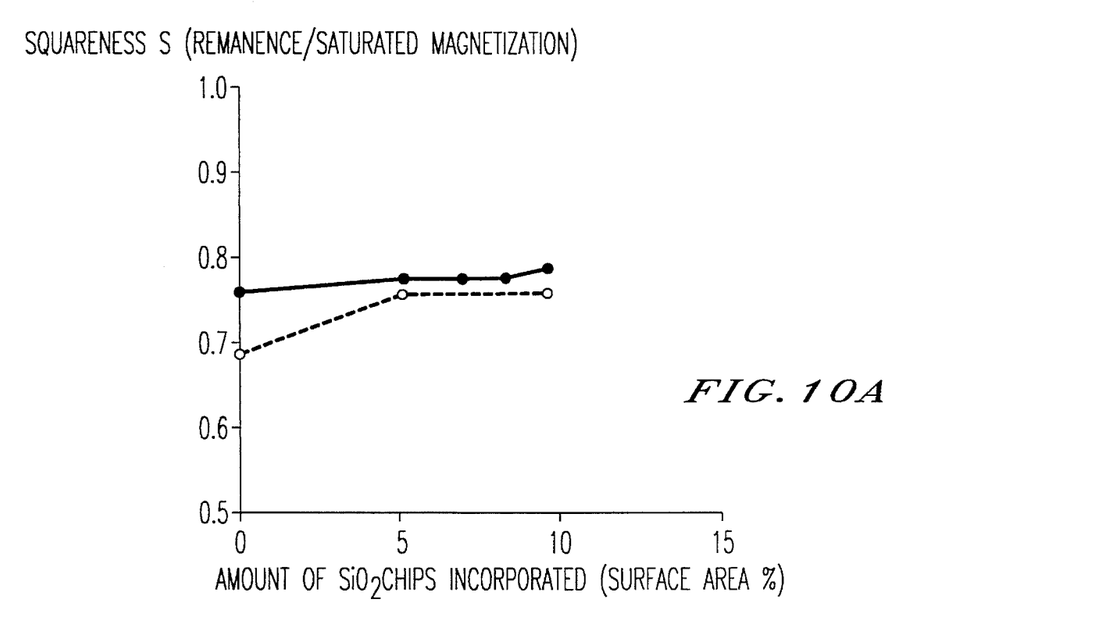
FIG. 10(a) is a graph showing the change in the squareness S of a CoNiCrPtSiO magnetic film against the amount of SiO$_2$ incorporated.
Figure 10B:
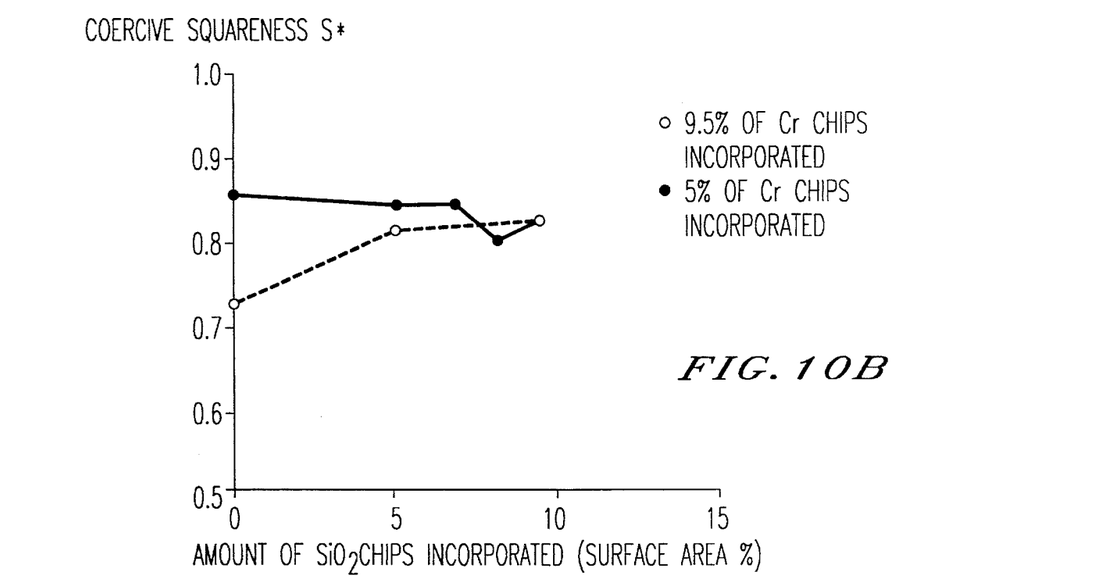
FIG. 10(b) is a graph showing the change in the coercive squareness S* of a CoNiCrPtSiO magnetic film against the amount of SiO$_2$ incorporated.

FIG. 10(a) shows the change in the squareness S in this case, and FIG. 10(b) shows the change in the coercive squareness S*. When 9.5% of Cr was incorporated, S and S* were at a level of about 0.7 where a problem may arise with respect to the electro-magnetic properties, if no SiO$_2$ is incorporated. However, by the incorporation Of SiO$_2$, a substantial improvement at a level of from 0.05 to 0.10 was observed, and adequate values for the electro-magnetic properties were obtained.

EXAMPLE 7

A Co(74.4 atomic %)Ni(6.5 atomic %)Pt(11 atomic %)SiO$_2$(8.1 atomic %) alloy target having a diameter of 15 cm and a thickness of 3 mm was prepared by a hot press method which comprises mixing 62 wt % of Co, 5.4 wt % of Ni, 30.3 wt % of Pt and 2.3 wt % of SiO$_2$ as raw material powders and maintaining the mixture under heating at 1,050° C. under a pressure of 300 kg/cm$^2$. Using this target, a magnetic recording medium having Nip/CoNiPtSiO$_2$/carbon film sequentially laminated on the same aluminum substrate as used in Example 1, was formed by sputtering. The sputtering was conducted by means of an Ar gas containing 0.1 vol % of nitrogen, and the pressure was 20 mTorr. No intentional heating of the substrate or no application of a bias voltage to the substrate was conducted during sputtering. The thickness of the NiP underlayer film was 420 Å, and the thickness of the magnetic film was controlled by adjusting the sputtering time so that the remanence would be 3.0×10$^{-3}$ emu/cm$^2$.

The concentration of SiO$_2$ in the actually formed magnetic film was determined to be 2.1 wt % by obtaining the proportion (atomic %) of Si by the ICP method and calculating the concentration of SiO$_2$ on the assumption that Si is present in the form of a stoichiometrical composition of SiO$_2$, and it substantially agreed to the concentration charged into the alloy target. The magnetic properties of the magnetic film thus obtained were measured, whereby the coercivity was 2,200 Oe, and the coercive squareness S* was 0.87. On the other hand, in the case of a CoNiPt magnetic film medium having NiP/CoNiPt/carbon film prepared under the same sputtering conditions by using a Co(81 atomic %)Ni(7 atomic %)Pt(12 atomic %) target containing no SiO$_2$, the coercivity was 1,720 Oe, and S* was 0.89. Namely, this indicates that by the sputtering employing a CoNiPtSiO$_2$ alloy target having SiO$_2$ preliminarily incorporated, a remarkably high coercivity was obtained without substantially impairing the squareness, as compared with the case where a CoNiPt target containing no SiO$_2$ was used.

Further, a Co(69.6 atomic %)Cr(11 atomic %)Pt(11 atomic %)SiO$_2$(8.4 atomic %) alloy target having a diameter of 15 cm and a thickness of 3 mm was prepared by the same hot press method as in the case of the above CoNiPtSiO$_2$ alloy target, by mixing 58.8 wt % of Co, 8.2 wt % of Cr, 30.6 wt % of Pt and 2.4 wt % of SiO$_2$ as raw material powders. Using this target, a magnetic recording medium having NiP/CoCrPtSiO$_2$/carbon film laminated, was prepared under the same sputtering conditions as in the case of CoNiPtSiO$_2$.

In this case, the concentration of SiO$_2$ in the deposited magnetic film was calculated to be 2.5 wt %, which substantially agreed with the concentration charged into the alloy target. Further, the magnetic properties of the magnetic film thus obtained were measured, whereby the coercivity was 1,960 Oe, and the coercive squareness S* was 0.82. On the other hand, in the case of a CoCrPt magnetic film prepared under the same sputtering conditions by using a Co(76 atomic %)Cr(12 atomic %)Pt(12 atomic %) target containing no SiO$_2$, the coercivity was 1,420 Oe, and S* was 0.73. Namely, this indicates that by the sputtering employing a CoCrPtSiO$_2$ alloy target having SiO$_2$ preliminarily incorporated, the squareness was improved, and a remarkably high coercivity was obtained, as compared with the case where a CoCrPt target containing no SiO$_2$ was used.

According to the present invention, even in a case where the Pt concentration in a CoPt-based alloy magnetic film is at a level of 10%, so that the cost is adequately low, a coercive squareness is reasonably high, at least 0.7 and a coercivity of at least 2,000 Oe at a remanence of 3.0×10$^{-3}$ emu/cm$^2$ which are required for future high density magnetic recording, can be realized without applying a bias voltage or high temperature to the substrate which makes mass production by sputtering extremely difficult, or without using O$_2$ reactive sputtering which is difficult to control due to its high reactivity. As described above, according to the present invention, excellent writing and reading characteristics can be realized, whereby a higher recording density will be possible. Further, the magnetic recording medium of the present invention has an excellent feature that it can be produced without impairing the mass productivity and without a substantial increase in the production costs.

What is claimed is:

1. A magnetic recording medium having a magnetic thin film represented by the following formula $Co_{100-a-b-x-y-z}Ni_aCr_bPt_xM_yO_z$ wherein a, b, x, y and z are atomic % satisfying $0 \leq a \leq 15$, $0 \leq b \leq 15$, $0 < x \leq 20$, $0 < y \leq 20$, $0 < z \leq 40$, $y+z \leq 40$, and $a+b+x+y+z \leq 60$, a and b not simultaneously being 0, and M is at least one element selected from the group consisting of Si, B, Zr, Al, P, Ti, Sn and In.

2. The magnetic recording medium according to claim 1, wherein M in the formula of the magnetic thin film comprises an oxide in the form of MO$_c$ wherein $0<c \leq 5$.

3. The magnetic recording medium according to claim 1, wherein the magnetic thin film has a squareness S and a coercive squareness S* in an in-plane magnetic hysteresis curve of at least 0.7.

4. A magnetic recording medium having a magnetic thin film represented by the following formula $Co_{100-a-b-x-y-z}Ni_aCr_bPt_xM_yO_z$ wherein a, b, x, y and z are atomic % satisfying $0 \leq a \leq 15$, $0 \leq b \leq 15$, $0 < x \leq 20$, $0 < y \leq 20$, $0 < z \leq 40$, $y+z \leq 40$, and $a+b+x+y+z \leq 60$, a and b not simultaneously being 0, and M is at least one element selected from the group consisting of Si, B, Zr, Al, P, Ti, Sn and In, prepared by the method which comprises forming the magnetic thin film by a sputtering method using a target having an oxide MO$_d$, wherein $0<d \leq 5$, of at least one element selected from the group consisting of Si, B, Zr, Al, P, Ti, Sn and In incorporated into a base material of a CoNiPt alloy, a CoCrPt alloy or a CoNiCrPt alloy.

5. The magnetic recording medium according to claim 4, prepared by a method wherein said oxide in the target is the same form of oxide as present in the magnetic film.

\* \* \* \* \*

UNITED STATES PATENT AND TRADEMARK OFFICE
CERTIFICATE OF CORRECTION

PATENT NO. : 5,478,661
DATED : December 26, 1995
INVENTOR(S) : Akihiro MURAYAMA et al It is certified that error appears in the above-indentified patent and that said Letters Patent is hereby corrected as shown below:

Column 1, line 62,  "Or" should read --or--.
Column 3, line 18,  "Oz" should read --$O_2$--.
         line 25,  "$CO_{10}$" should read --$CO_{100}$--;
         line 30,  "in" should read --In--;
Column 6, line 7,   "or" should read --of--.
Column 7, line 48,  "$Co_{76}Cr_{12}PT_{12}$" should read --$Co_{76}Cr_{12}PT_{12}$--.
Column 10, line 56, "$(SiO2)5$" should read --$(SiO_2)_5$--.
Column 11, line 13, "Nip" should read --NiP--.
Column 12, Claim 1, line 29,  "CO" should read --Co--.

Signed and Sealed this

First Day of April, 1997

BRUCE LEHMAN

Attest:

Attesting Officer        Commissioner of Patents and Trademarks